United States Patent [19]
Anstey

[11] Patent Number: 5,786,537
[45] Date of Patent: Jul. 28, 1998

[54] VIBRATORY GROUND-SURVEY SYSTEM

[76] Inventor: Nigel A. Anstey, Cedar Lodge, Glen Mona, 1M7 1HG, Isle of Man

[21] Appl. No.: 705,767

[22] Filed: Aug. 30, 1996

[30]   Foreign Application Priority Data

Jul. 24, 1996 [GB] United Kingdom ............... 9615576

[51] Int. Cl.$^6$ ............................................. G01P 15/02
[52] U.S. Cl. ............................................. 73/662; 181/121
[58] Field of Search ........................... 73/662, 663, 549; 367/189.14; 181/121, 122; 364/421

[56]   References Cited

U.S. PATENT DOCUMENTS

| | | | |
|---|---|---|---|
| 3,999,626 | 12/1976 | Adams | 181/121 |
| 4,026,383 | 5/1977 | Bedenbender | 181/121 |
| 4,706,231 | 11/1987 | Mueller | 181/121 |
| 4,749,057 | 6/1988 | Anstey | 181/121 |
| 5,079,463 | 1/1992 | Matsuyama | 181/121 |
| 5,154,254 | 10/1992 | Thompson | 181/121 |
| 5,327,399 | 7/1994 | Ansada | 181/121 |

*Primary Examiner*—Christine K. Oda
*Attorney, Agent, or Firm*—Chris A. Caseiro; Thomas L. Bohan

[57]   ABSTRACT

A rotary vibrating system is used in surveys of the acoustic properties of the shallow earth. The vibrator itself is of eccentric-mass (or "swinging-weight") form. Coupled to a flywheel, it decelerates freely from a selected high frequency to a selected low frequency. The observed deceleration rate is manipulated to give a measure of the acoustic properties of the near-surface. The eccentricity of the vibrator is then annulled, and the flywheel and vibrator accelerated back to the selected high frequency for another measurement at another location. A display in map form is provided to facilitate visual interpretation of the results.

5 Claims, 11 Drawing Sheets

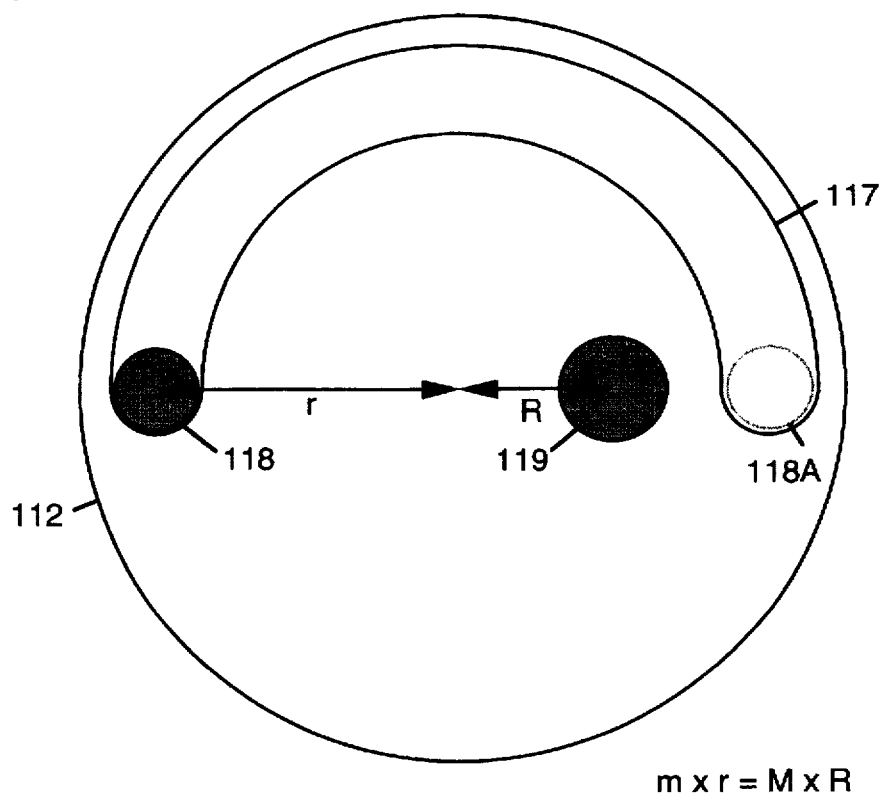

VIBRATORY GROUND-SURVEY SYSTEM

CROSS REFERENCE TO RELATED APPLICATIONS

This patent application is based upon British patent application 9615576.7, entitled "Vibratory Ground-Survey System." Applicant filed this British application in the United Kingdom on Jul. 24, 1996, and herewith claims the priority date of this application.

The present application is also related to British patent application 9524689.8 filed Dec. 2, 1995 and entitled "Swinging-Weight Vibrator for Seismic Exploration."

TECHNICAL FIELD

This invention is concerned with the properties of the material at and just below the surface of the earth. This information is of value in preparing the foundations of buildings, in planning excavations, in locating buried objects, in identifying previous ground disturbance, and in studying ground water and other resources.

In recent years such investigations have been advanced significantly by ground-penetrating radar. However, the depth of penetration of radar is seriously reduced if the subsurface is saturated with water. The present technique seeks to complement radar investigations, particularly where the subsurface is wet.

BACKGROUND ART

It is well known that some properties of a solid may be assessed by striking it with a sharp blow. Thus the integrity of a metal wheel can be assessed by striking it with a hammer, the position of a stud can be estimated by knocking on a plasterboard wall, a cement bond can be evaluated by "pinging" it, and hidden graves can be sought with an archeologist's "boser" stick. In effect, the operator delivers an impulse, and listens for the acoustic impulse response. This impulse response depends on the resonance of the mass-spring system represented by the struck body, and on the damping of that system; these features depend to some extent on the radiation of sound energy into the solid, and so on its radiation impedance.

Although the traditional test signal is an impulse, it is well known that the same result can be obtained with a succession of sine waves. The sinusoids do not have to extend in frequency from zero to infinity; it is sufficient to cover the bandwidth in which the diagnostic part of the response is contained. This useful bandwidth normally includes the frequencies of the major resonances, and the range of frequencies best radiated into the solid.

It is also well known that the necessary succession of sinusoids, over a defined frequency range, can be implemented as a swept-frequency signal; this quasi-sinsusoidal signal starts at one end of the frequency range and slowly sweeps to the other end. Then the response of the solid to this signal contains the same information as the impulse response, within the defined bandwidth.

Also representing background to the present invention is U.S. Pat. 4,749,057, to the present inventor. The patent describes an eccentric-mass or "swinging-weight" vibrator adapted for use in the Vibroseis system of seismic exploration for oil and gas. This is an echo-ranging system for deep rock layers; a long swept-frequency signal is applied to the surface of the earth, transmitted into the deep earth, reflected by contrasting rock layers, received back at the surface, and correlated with the emitted signal to give a measure of echo time. A distinctive feature of the vibrator described in the patent is that the rotating mass becomes eccentric after it has been accelerated to a chosen maximum frequency; the drive is then disabled and the vibrator coasts down in frequency driven only by a flywheel.

Provided the vibrator is efficient (in the sense that most of the stored energy is radiated as seismic waves), it is found that the vibrator decelerates more quickly at those frequencies where (because of resonances or other factors) large power is radiated, and less quickly at those frequencies where small power is radiated. This provides a measure of automatic compensation for these undesirable variations in emitted power, since the vibrator dwells longer (and hence emits more energy) at those frequencies where the emission is poor.

The present invention is based on the same observation; however, instead of employing the natural variations of sweep rate as an automatic compensation of frequency content for the signal transmitted deep into the earth, it employs these variations as a measure of the properties of the near-surface. This is in contradistinction to the practice of seismic exploration, in which the vibratory signal is transmitted deep into the earth, is there reflected or refracted, and is then detected at a surface or downhole geophone; the present invention is concerned only with the near-surface, makes no measurements on the signal transmitted into the earth, and requires no geophone.

OBJECTS OF THE INVENTION

Accordingly it is an object of this invention to obtain a measure of the acoustic properties of the material at and near the surface of the earth.

It is a further object to provide means by which this can be done rapidly and conveniently with a transportable vibrator, so that areal variations in these properties may be mapped.

It is a further object to obtain the said measure of acoustic properties from the sweep rate of a rotating mechanical vibrator in free deceleration.

It is a further object to provide a display by which areal variation in the acoustic properties of the near-surface may be visually assessed and interpreted.

DISCLOSURE OF THE INVENTION

These objects are achieved with a vibrator having five main mechanical parts: a baseplate, a hold-down mechanism, the vibrating actuator itself, a flywheel and a motor. In operation the motor drives the flywheel up to a high "start" frequency, with the vibrator inactive; this is termed the "run-up" or acceleration part of the cycle. Then the vibrator is activated, driven by the flywheel; the resulting vibration is transmitted to the ground through the baseplate, which is held in contact with the ground by the hold-down mechanism; the system coasts down to a low "end" frequency (the "run-down" or deceleration part of the cycle), during which the sweep rate is measured and recorded; the vibrator is disengaged and the apparatus moved to the next location; and the cycle is repeated.

The area to be investigated is divided into a grid of cells, with one vibrator location in each cell. The sweep-rate measurement is manipulated into a form that may be easily assessed visually, and presented in a display representing all the cells of the grid. Areal variations in the acoustic properties of the ground may then be seen directly in this display.

BRIEF DESCRIPTION OF THE DRAWINGS

The apparatus and method are now described by reference to the drawings, in which:

3

Figure 4:
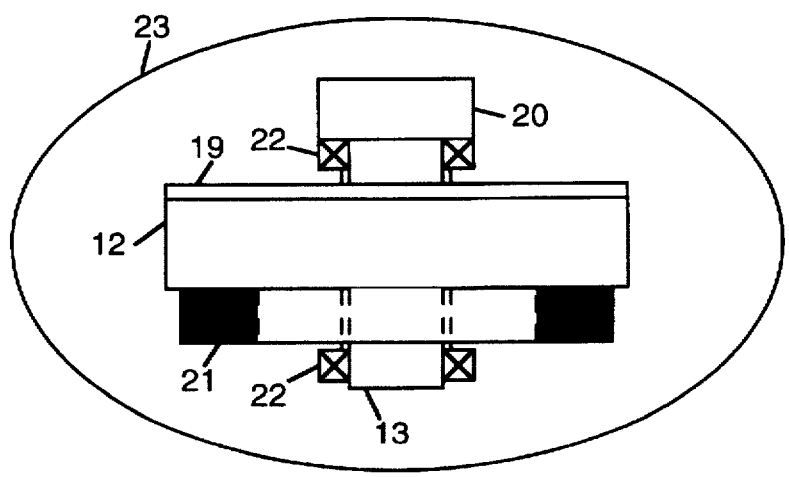
Figure 5:
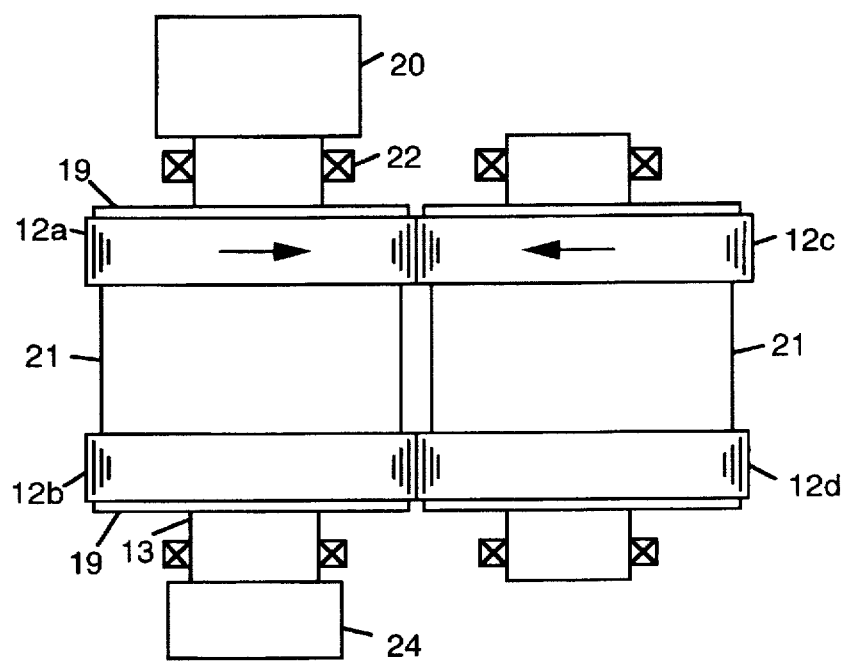
Figure 6:
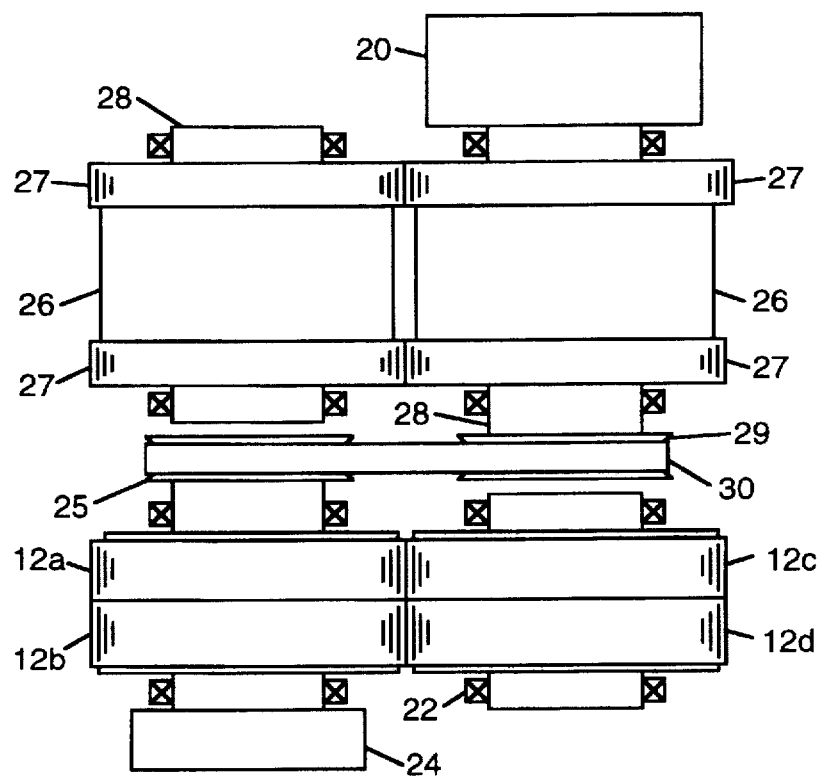
Figure 10:
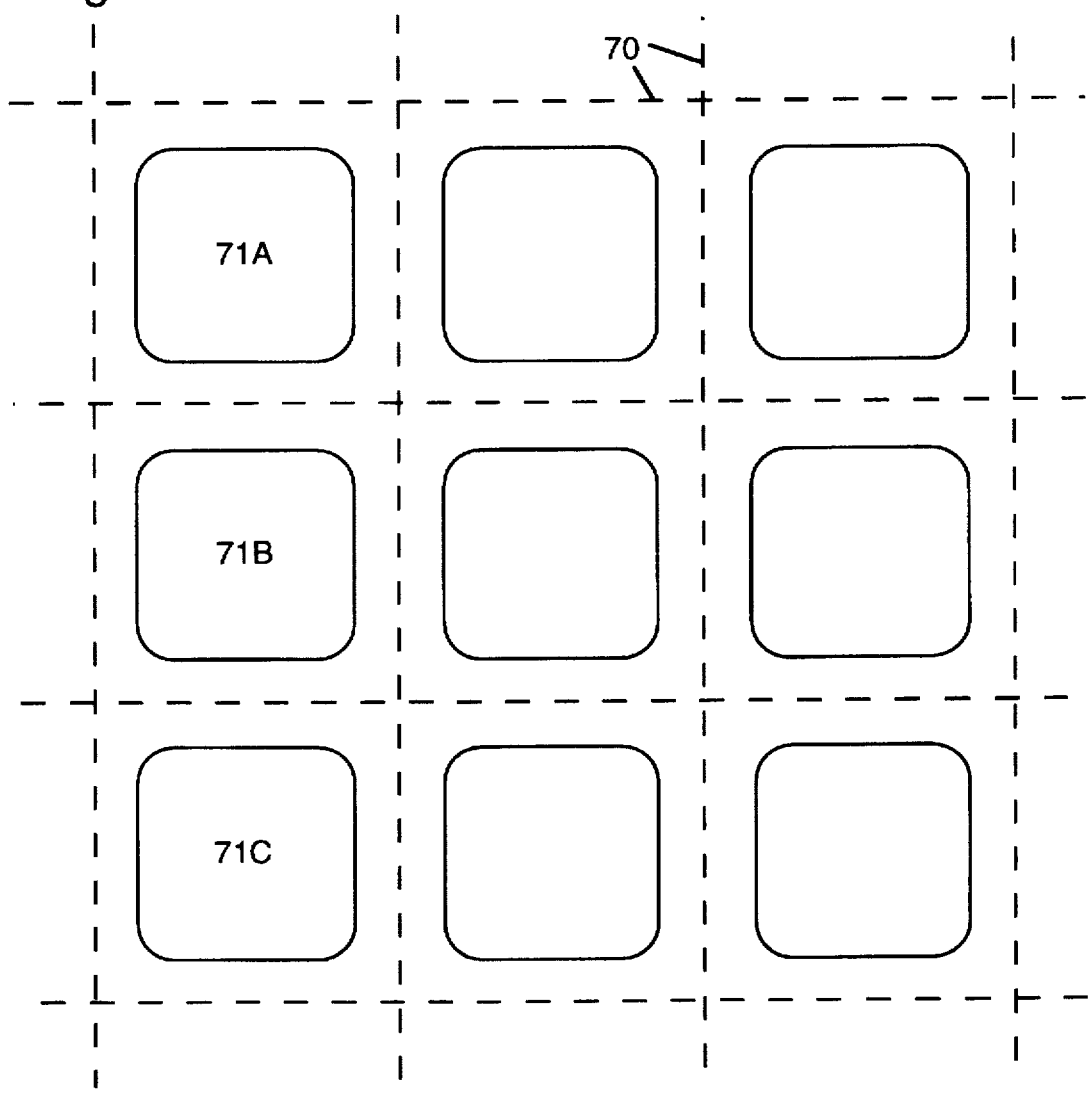
Figure 11:
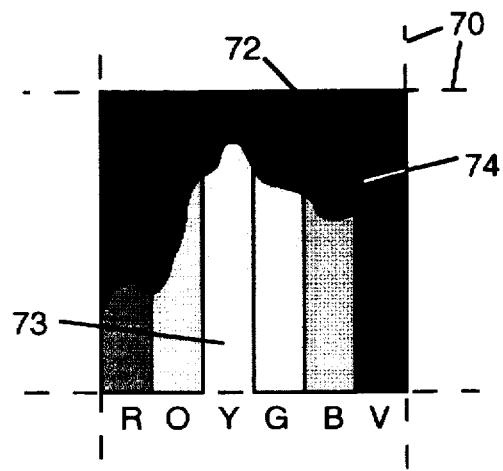

FIG. 1 (prior art) illustrates a conventional eccentric-mass vibrator at A and B, and a known modification of this conventional form at C;

FIG. 2 illustrates representative active components of the eccentric-mass vibrator of the aforesaid Application 9524689.8, which are capable of adaptation for use as the vibrating wheel in the present invention;

FIG. 3 illustrates, in elevation and in section, an alternative form for the vibrating wheel of the present invention, again providing vibration during deceleration and no vibration during acceleration;

FIG. 4 illustrates a simple vibrator using one of these wheels;

FIG. 5 illustrates an adaptation incorporating the usual contrarotating arrangement for eliminating either horizontal or vertical vibration by appropriate phase;

FIG. 6 illustrates an adaptation that allows removal of motor and flywheel mass from the baseplate;

FIG. 7 illustrates a particular implementation of this adaptation, in several views;

FIG. 8 illustrates means for transporting the vibrator between test locations;

FIG. 9 illustrates means by which the position and motion of the vibrator baseplate may be constrained vertically and horizontally;

FIG. 10 illustrates a measurement grid on the surface of the earth, and successive vibrator positions occupied as the survey proceeds; and FIG. 11 illustrates one cell of an appropriate display of the results.

BEST MODE FOR CARRYING OUT THE INVENTION

Figure 1A:
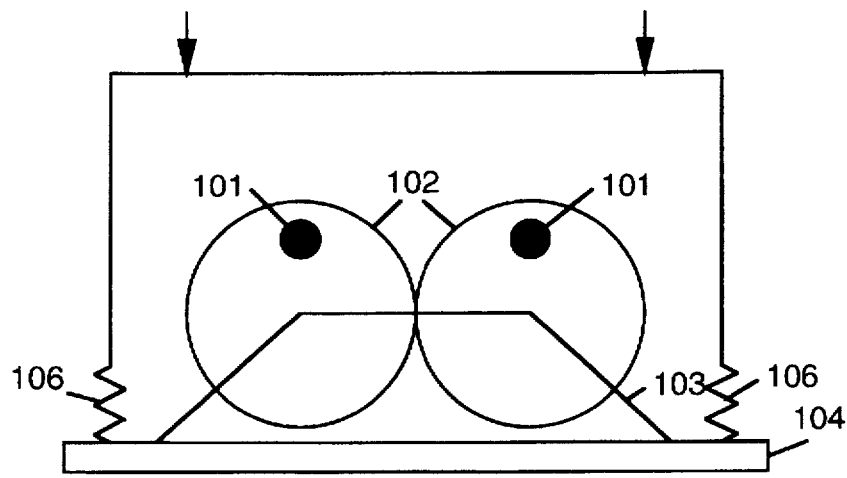
Figure 1B:
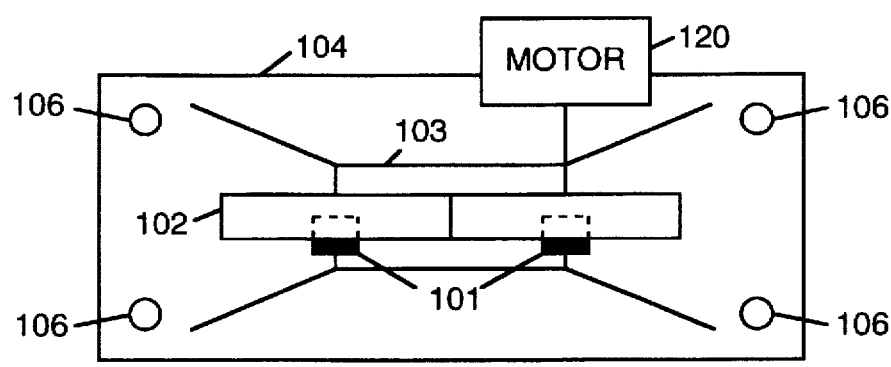

The first component of the disclosed ground-survey system is a suitably configured ground vibrator. The preferred type of vibrator is an eccentric-mass unit, for which the generic form is illustrated in FIGS. 1A and 1B. These figures (from the aforesaid U.S. Pat. 4,749,057) depict such an eccentric-mass vibrator of the prior art, in elevation and plan. Two contrarotating gear wheels 102 carrying eccentric masses 101 are supported on a frame 103, by which the vertical component of vibration is transmitted to baseplate 104. The gear wheels 102 are driven by motor 120. Hold-down weight (indicated by vertical arrows) is applied to the baseplate 104 through springs 106, whose natural frequency is chosen to be below the lowest vibration frequency.

Figure 1C:
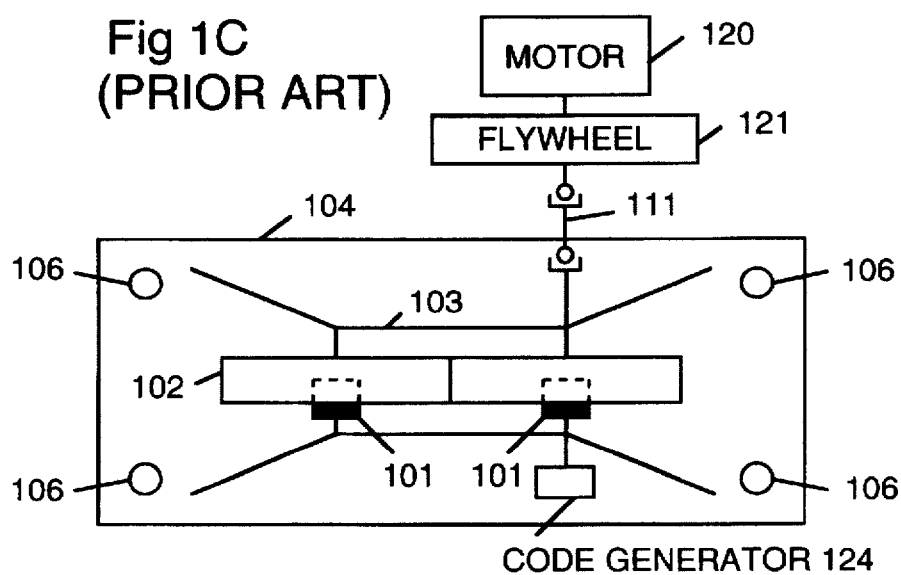

The adaptation required for flywheel drive (as disclosed in the aforesaid U.S. Pat. No. 4,749,057) is illustrated in FIG. 1C. The motor 120 drives a flywheel 121. In order to reduce the mass on the baseplate, the motor and flywheel are supported separately, and drive the vibrator through a flexible coupling 111. In operation the eccentricity of the vibrator is annulled during the acceleration of the motor and flywheel, and restored during the deceleration. Various schemes are available to permit full control of the eccentricity, both as regards the eccentric mass and the eccentric radius. Since use of this vibrator for seismic exploration requires that the signal transmitted into the earth is known, a code generator 124 is incorporated to give the frequency-time relation.

Alternative methods for annulling the vibration are described in the aforesaid Application 9524689.8. One of these is illustrated in FIG. 2 (corresponding to FIG. 2 of the aforesaid Application); the eccentric mass is formed in two parts (such as 119 and 118), the first of which is fixed in a rotating wheel 112 and the second of which is free to roll in a curved track 117 between two limiting positions within the wheel. During clockwise acceleration the second (free) mass 118 assumes a position in which the two masses are balanced, and no vibratory force is generated. During deceleration the free mass 118 rolls round the track 117 to the limiting position 118A, in which it adds to the imbalance of fixed mass 119 to generate a large vibratory force.

The aforesaid Application 9524689.8 extends this concept to large vibrators appropriate to full-scale seismic exploration of the deep earth, and Applications 9520941.7 and 9520942.5 develop further the control and application of such vibrators. In the present context, however, the concept requires a configuration at smaller scale, and for a different use that no longer requires to transmit seismic waves into the deep earth. This practical configuration is found to depend on the nature of the ground surface, the degree to which this nature varies over the area to be tested, and the depth to which the properties of the material are to be sampled. Therefore it should be understood that the configurations here described are susceptible to modification if the ground is unusually hard or unusually soft, or if the anomalies sought are unusually deep.

For general-purpose use, it is convenient to configure the vibrator/baseplate system to operate in a frequency range from one or two hundred hertz down to one or two tens of hertz. This range allows the use of standard mechanical components (100 Hz being equivalent to 6000 rpm, and 10 Hz to 600 rpm).

It is also convenient if the vibrator deceleration at each test location occupies some 5–15 seconds, and the motor is capable of accelerating the flywheel from the end frequency back to the start frequency in a comparable time, sufficient to allow movement of the apparatus from one test location to the next.

Then the baseplate should be of such a nature and dimensions that diagnostic resonances or other anomalies in the vibrator/ground coupling are within this desired frequency range, and the deceleration occupies this desired time. However, it remains true that the baseplate should be of small mass (relative to that of the mass of earth moving with it); yet it must not be subject to flexure. As a practical matter, its optimum size may also vary with the roughness of the ground surface. Again, the baseplate size affects the harmonic distortion occurring at the baseplate/ground interface (the earth's surface being generally easier to pull up than to push down). Yet again, the baseplate dimension affects the depth of penetration, and the vibratory force required to realize useful penetration.

The maximum vibratory force, in turn, is limited by the hold-down force, since in general the baseplate should not be allowed to leave the ground. For small-scale site-survey operations, it is convenient if most of the hold-down force is provided by the weight of the operator.

One configuration that can be adapted to satisfy these criteria in many practical cases is now described by reference to FIGS. 3–9.

Figure 3A:
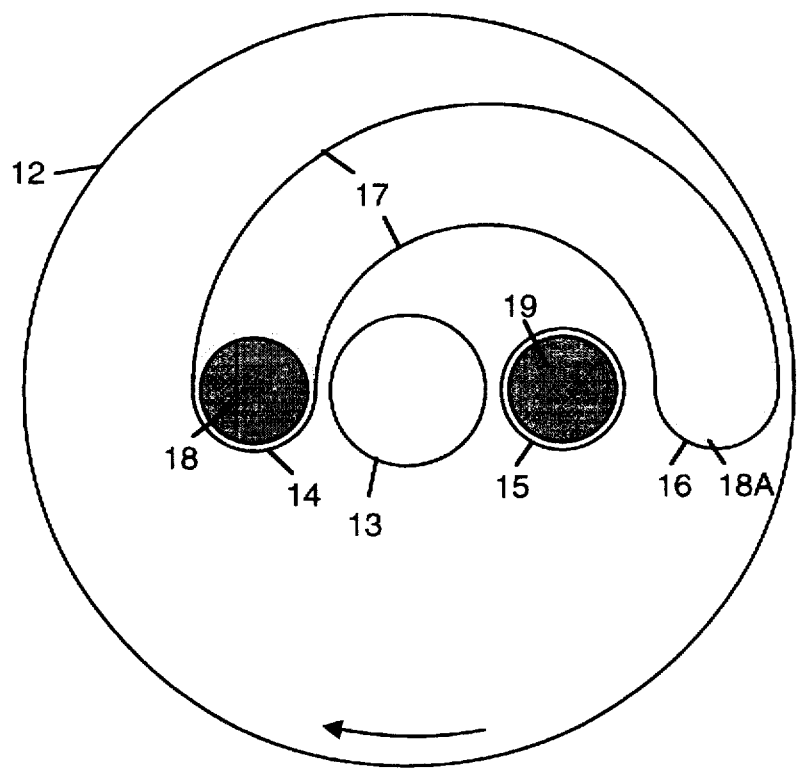
Figure 3B:
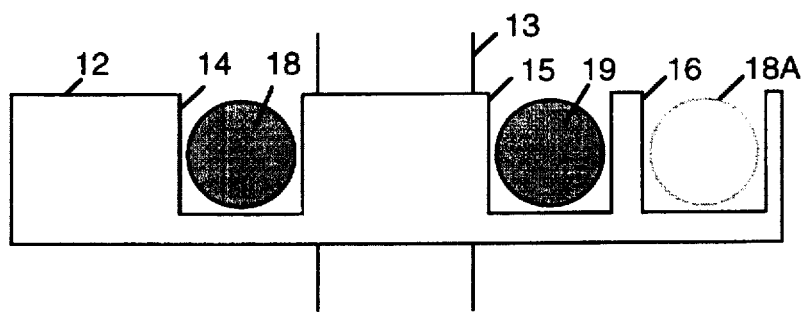

The eccentric wheel at the heart of the vibrator may take the form generalized in FIG. 2. As a variation on this, and to illustrate the generality of the form, FIG. 3 depicts an alternative expression. In FIG. 3A the wheel 12 is shown in elevation, and in FIG. 3B in section. The wheel rotates (for illustration, clockwise) on shaft 13. To reduce the mass of the components integral with the baseplate, the wheel 12 and shaft 13 (and their mountings on the baseplate) are preferably of low-density material; however, they must also be strong enough to withstand the considerable forces generated.

Two balanced holes 14 and 15 are formed in the wheel, at small radius. A similar hole 16 is formed at large radius, and a curved track 17 is formed between holes 14 and 16. Balancing voids (not shown) are formed to balance the track 17 and the hole 16, so that rotation of the wheel itself generates no vibratory forces on the shaft.

A suitable spherical mass 19 (such as a ball bearing) is then introduced into hole 15, and another 18 into hole 14. In these positions, the balls retain balance. If the wheel is now accelerated from rest, clockwise, ball 19 remains in hole 15, while ball 18 remains forced against the anticlockwise wall of hole 14; the wheel remains balanced, and the acceleration generates no vibratory forces. Acceleration of the wheel may continue until the desired start frequency is reached. At this point, removal of the drive (which may be supplemented by momentary braking of the drive) causes the ball 18 to fly round the track 17 to the position 18A. The wheel is now strongly off balance; vibratory forces are generated on the shaft, and transmitted to the baseplate. These forces do work on the baseplate/earth system, causing further deceleration; it is the rate of this deceleration, and variation in the rate with frequency and with the nature of the ground, that provide the basic measurement in the application of the invention.

When the wheel has decelerated to the desired end frequency, the drive is restored. As the wheel accelerates, the ball 18 leaves position 18A and returns round the track 17 to occupy the hole 14 as before. This restores balance to the wheel, so that further acceleration is made easy; the cycle then repeats. During the acceleration period the vibrator may be moved to the next test location.

Clearly, the duration of the deceleration period (or "run-down") may be adjusted by addition of a flywheel having an appropriate moment of inertia. Then the duration of the acceleration period (or "run-up") may be selected by choice of the motor power.

The most basic configuration then becomes as shown (in plan) in FIG. 4. The vibrator wheel 12 is as described above, with a cover plate 19 to retain the balls within. The shaft 13 rotates in bearings 22, held by support means (not shown) attached to the baseplate 23. The flywheel is provided by a heavy ring 21 attached to the wheel 12. The motor 20 drives the shaft 13 directly during the run-up; if of suitable type it may also function as the frequency transducer during the run-down.

Within the plane of rotation, the simple apparatus of FIG. 4 generates forces in all directions, resolvable into vertical and horizontal components. The horizontal components evoke an earth response that depends on the shear properties of the near-surface. In those situations where this reponse is separable and interpretable, the additional information may be valuable; then, to prevent sliding of the baseplate, it is necessary to provide pyramidal teeth on its underside, or to increase the hold-down weight.

In many situations, however, it is best to cancel the horizontal components using the classical contrarotating vibrator wheels of FIG. 1. FIG. 5 illustrates a modification of FIG. 4 to incorporate this feature, and a further modification to increase the force output. The modification to increase the force output is the addition of a second vibrator wheel 12b on the same shaft as the original wheel 12a; the flywheel is then the hollow cylinder 21, secured by bolts (not shown) through both vibrator wheels 12a and 12b. The modification to cancel the horizontal components of vibration is the addition of a second complete vibrator (using wheels 12c and 12d), and the provision of gear teeth at least on wheels 12a and 12c, but preferably on all four wheels 12. The gear teeth are cut to allow engagement when all four holes 16 in FIG. 3A are at the top (for example) of their trajectory. This arrangement imposes no couples on the shafts, and applies the vertical forces to the shafts in positions close to the bearings. A tacho 24 may be added on the shaft 13.

FIG. 5, then, represents a simple and practical arrangement. However, it has the disadvantage that the mass of the flywheels and the motor must move with the baseplate; this makes the deceleration rate less sensitive to the acoustic properties of the ground. In situations where this loss of sensitivity is a problem, and with some sacrifice of simplicity, the flywheels and the motor may be removed from the baseplate. A configuration providing this is shown in FIG. 6.

The lower part of FIG. 6 is a counterpart to FIG. 5, except that the flywheels 21 are removed; although four wheels 12a–d are shown, wheels 12a and b could obviously be formed now from one block, and 12c and d from another. The motor is also removed from the vibrator shaft, and replaced by a pulley 25. Only this lower part is now mounted on the baseplate.

The flywheels 26 and the motor 20 now become part of a separate unit, mounted on the hold-down frame. Again there are two shafts (28), and gears 27 so that the two flywheels rotate in opposite directions; this is desirable when the machine comes to be moved. The drive from the pulley 29 to the pulley 25 is through a flexible chain or belt 30; the two pulleys are at the same horizontal level, so that the vertical motion of the baseplate (relative to the much smaller vertical motion of the hold-down frame) is acommodated by the belt.

A practical configuration incorporating the scheme of FIG. 6 is shown in FIG. 7.

Figure 7A:
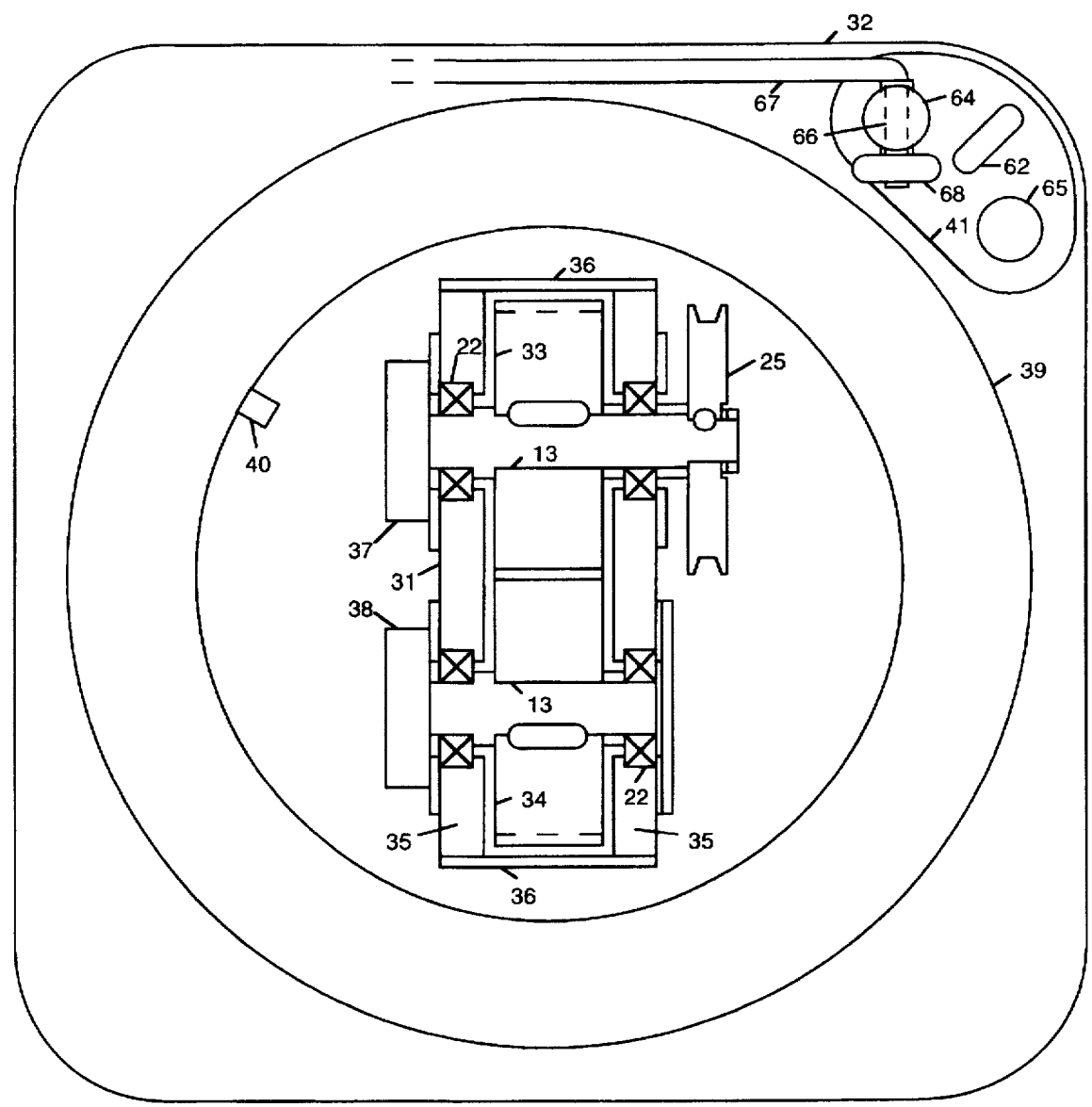

FIG. 7A is a plan view of the vibrator unit 31 on the baseplate 32; the vibrator is shown in horizontal section. The double vibrating wheel 12a, b in FIG. 6 becomes 33 in FIG. 7, while 12c, d becomes 34. The two wheels, keyed or splined to stout shafts 13, rotate in bearings typified at 22, which are supported in stout side plates 35 securely anchored to the baseplate 32. The side plates are braced by end plates 36 and a top plate (not shown). The drive to the unit is through keyed or splined pulley 25. A fail-safe brake may be mounted at 37, and a frequency transducer or tacho at 38.

Also shown in FIG. 7 is a pneumatic tube 39, which constitutes the equivalent of the spring 6 in FIG. 1; this is conveniently a vehicle inner tube, inflated through valve 40. The tube may be located on a suitable rim (not shown), and protected by a suitable rubber case or tyre. Foam material may be injected into the tube to add damping if required.

Also shown is one (of four) identical corner-units 41, whose functions of centralizing the vibrator and limiting its displacement are described hereinafter.

Figure 7B:
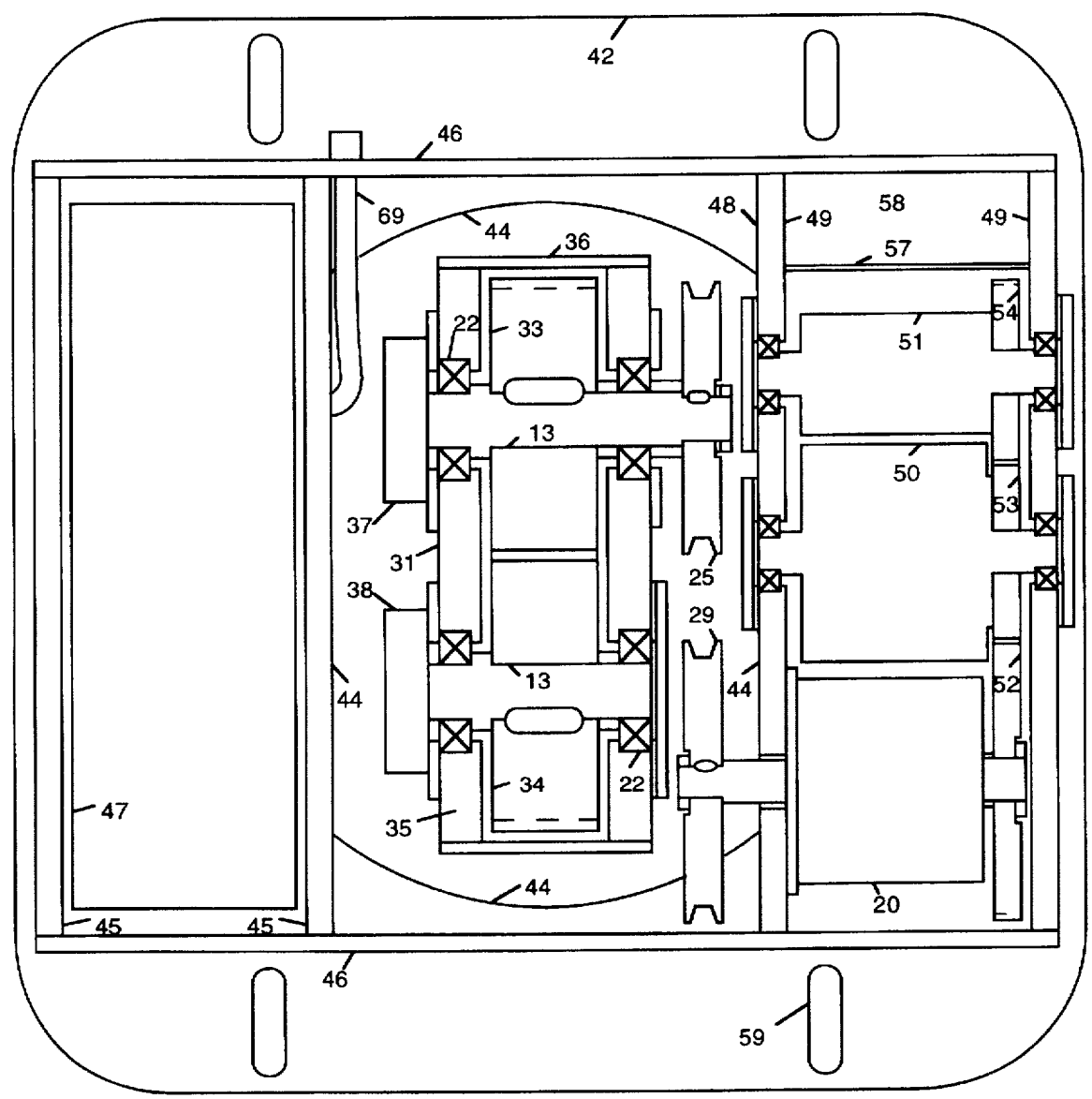

FIG. 7B illustrates, in plan, the midplate 42 located in position above the baseplate; for illustrative purposes it is taken to be the same size and shape as the baseplate, so that it obscures the baseplate in the drawing. However, the midplate 43 has a hole, through which the vibrator unit 31 protrudes; the sides of this hole (two straight, two curved) are shown at 44. To the left of this hole, in FIG. 7B, a compartment mounted on the midplate is formed by side members 45 and end members 46. This compartment contains the battery 47 to power the unit.

To the right of the hole the drive assembly 48 is also mounted on the midplate; this is shown in horizontal section, through the same plane as the vibrator unit 31. Side plates 49 (braced by the same end plates 46) carry the motor 20 and the contrarotating flywheels 50 and 51. At one end, the motor shaft carries the pulley 29, which aligns with the vibrator pulley 25. At the other, it carries a gear 52, which drives the flywheels through gears 53, 54. In the illustration, advantage is taken of the option to drive the flywheels faster than the motor, in order to reduce the flywheel size. Also as an option, the flywheel 50 is shown as larger than the flywheel 51; the difference is calculated to offset the effect of the moment of inertia of the motor 20 (which rotates in the same direction as the smaller flywheel 51).

In operation, the motor 20 accelerates the flywheels 50, 51; at the same time, through the drive belt 30 (of FIG. 6, not shown in FIG. 7B), it drives the vibrator up to the chosen start frequency. No vibration is generated, because during acceleration the vibrator wheels are balanced. Then the power to the motor is switched off, and the vibrator wheels begin to decelerate and to vibrate; the system coasts down, driven by the flywheels, until it reaches the chosen end frequency.

Figure 7C:
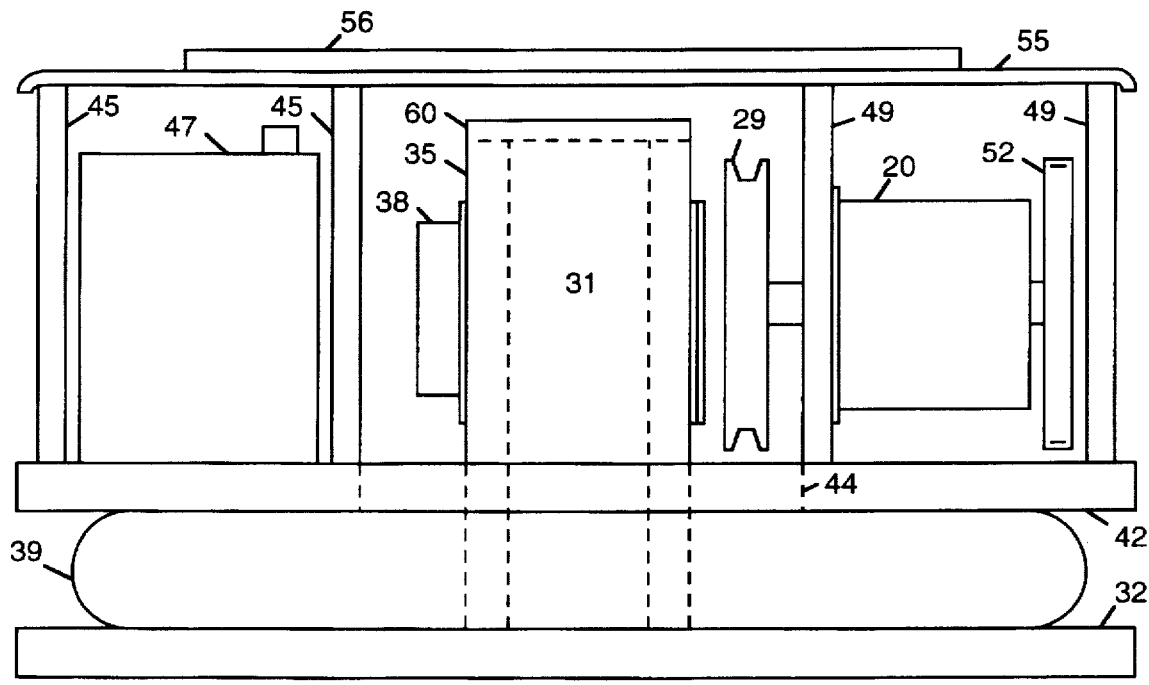

FIG. 7C is an elevation view from the bottom of FIG. 7B (with endplate 46 taken as transparent). The baseplate 32 and the midplate 42 are held apart by the airtube 39. The vibrator 31, securely attached to the baseplate, protrudes through the hole in the midplate, so that in operating position the vibrator pulley 25 is at the same level as the motor pulley 29 (and therefore obscured by it in the figure). The top plate 60 on the vibrator 31 is visible in this view, as is the top plate 55 over the complete machine. The footplates 56 indicate where the operator should stand when acting as hold-down.

Figure 7D:
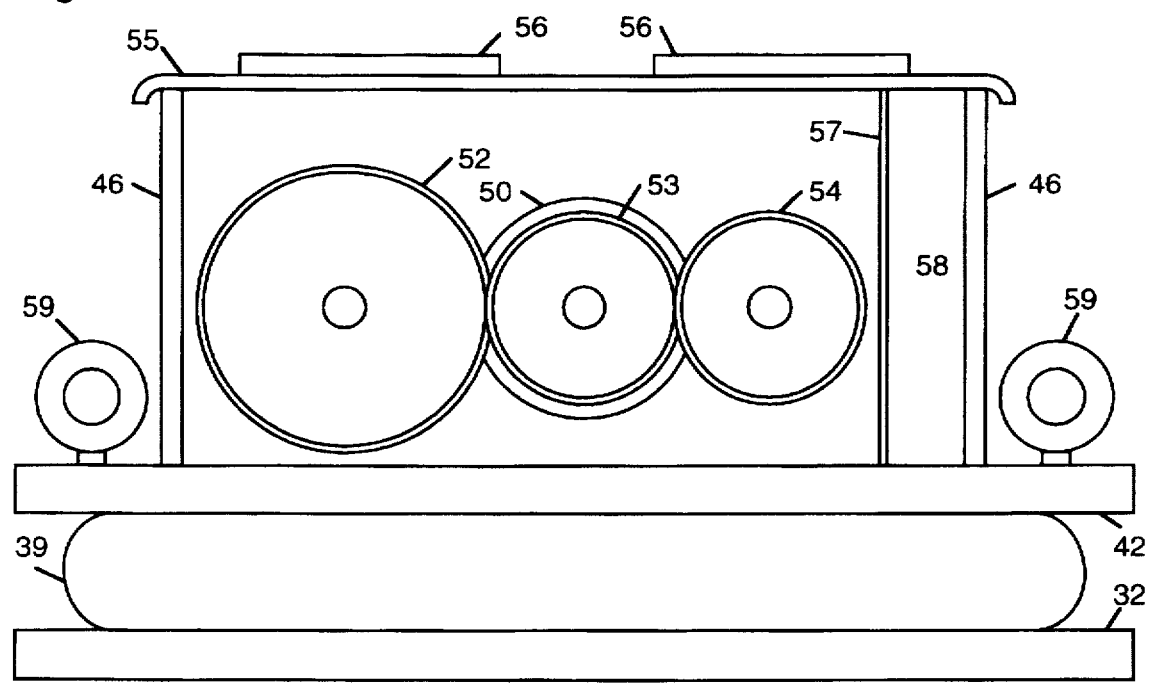

FIG. 7D is an elevation view from the right of FIG. 7B (with outside end plate 49 taken as transparent); it shows the gear 52 (obscuring the motor 20 behind it), the gears 53 and 54 (the latter obscuring the flywheel 51 behind it), and the flywheel 50. An added plate 57 defines a compartment 58, in which the necessary electronics can be housed. Eyes 59 are bolted to the mid-plate 42 to facilitate handling.

Figure 7E:
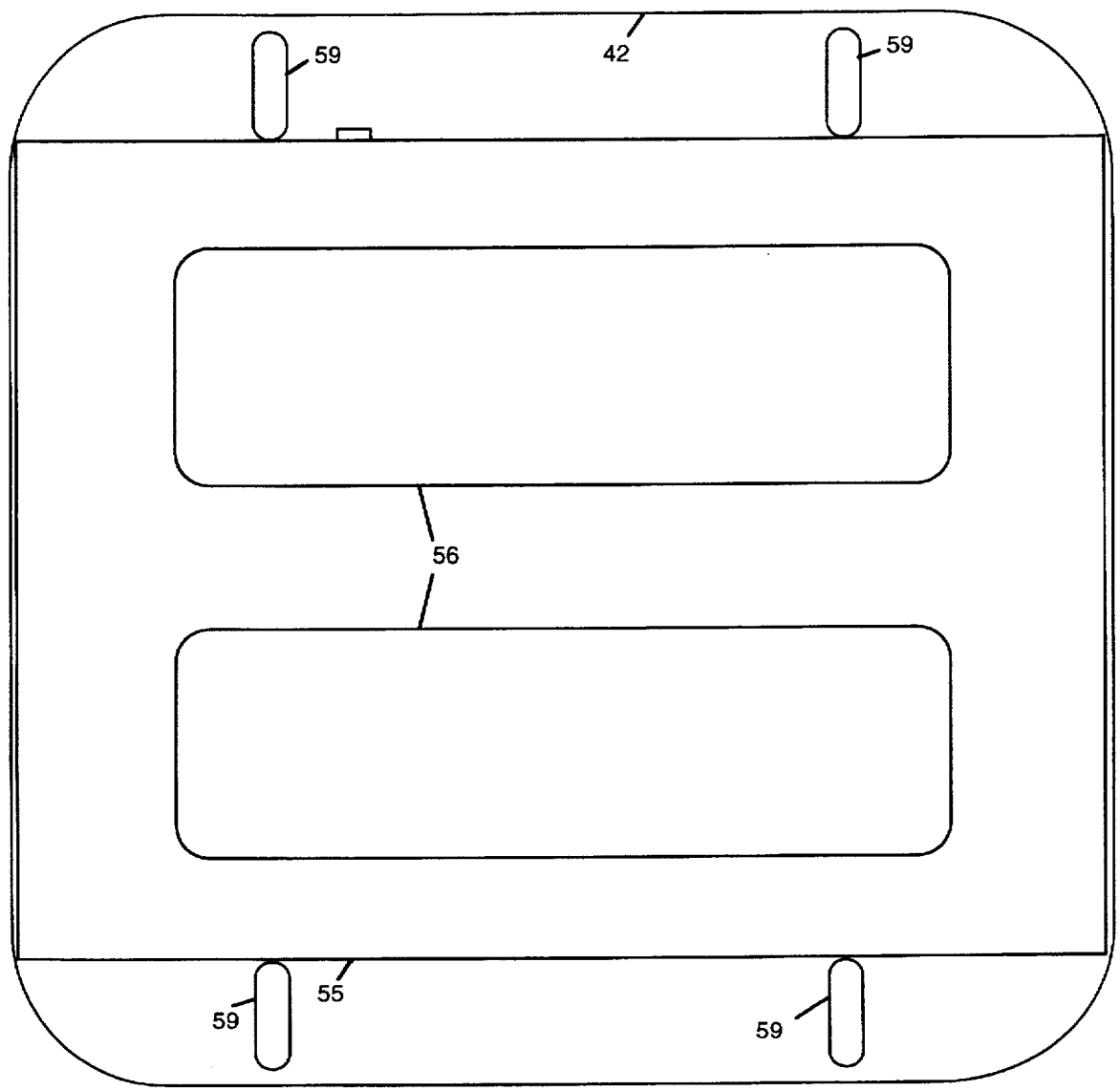

FIG. 7E is a plan view of the complete vibrator.

Figure 8A:
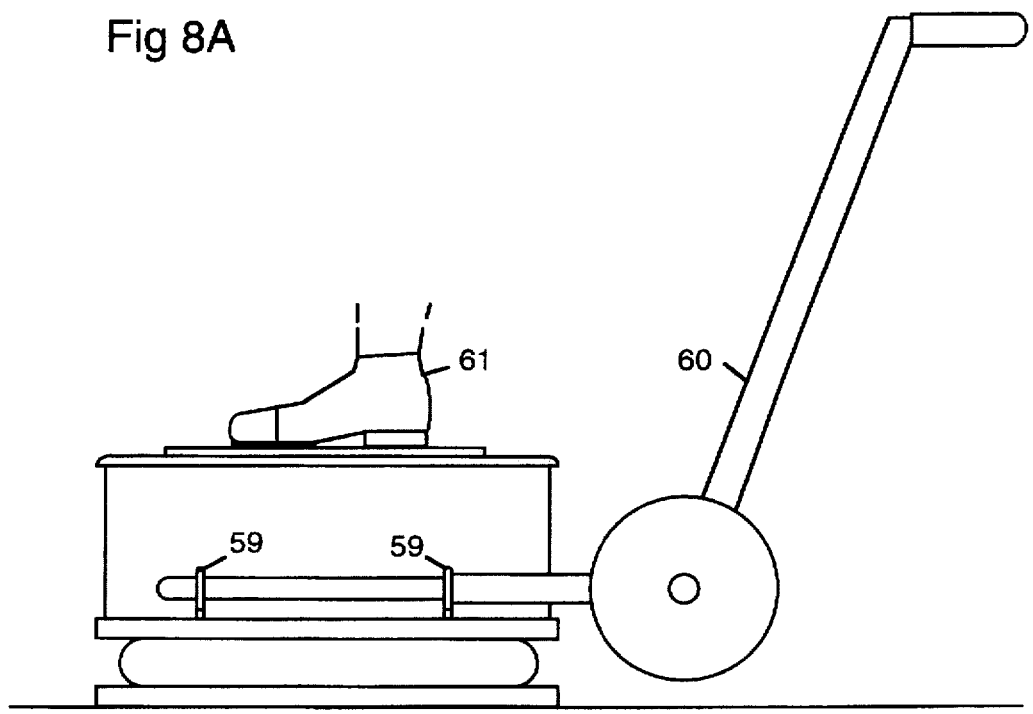
Figure 8B:
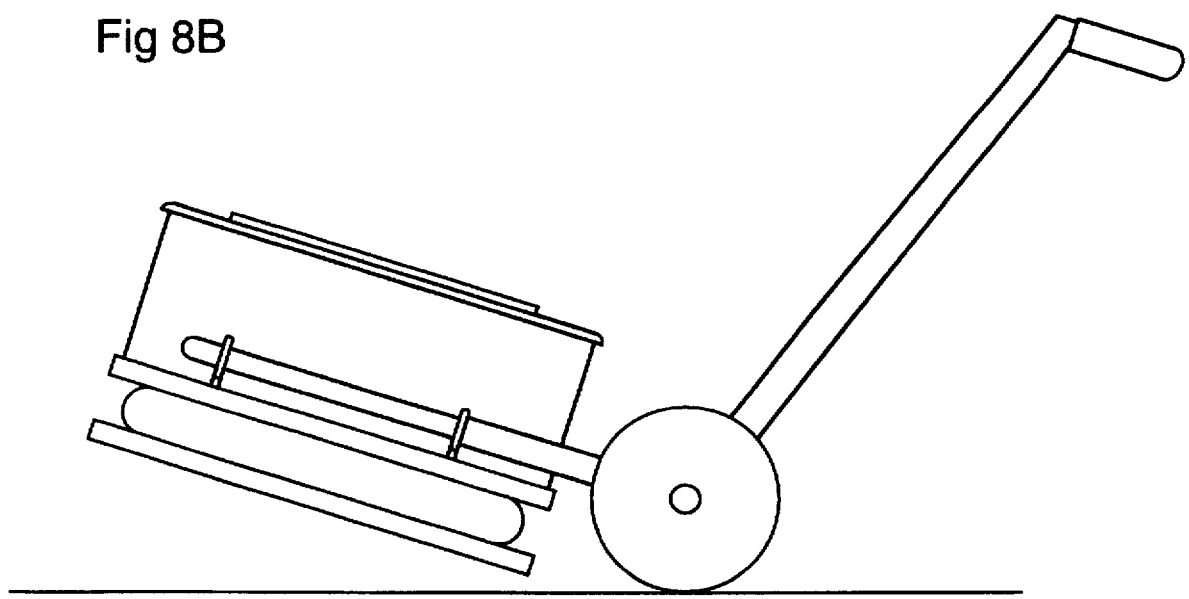

FIG. 8A shows how the eyes 59 may be used with a fork-lift caddy 60 for transporting the vibrator between test locations. During the run-down the operator stands on the machine, as suggested at 61; the wheels of the caddy are off the ground, and the weight of the caddy supplements the operator's hold-down weight. During the run-up the operator tilts the caddy to the position of FIG. 8B (where the wheels are on the ground), and moves to the next location.

Figure 9A:
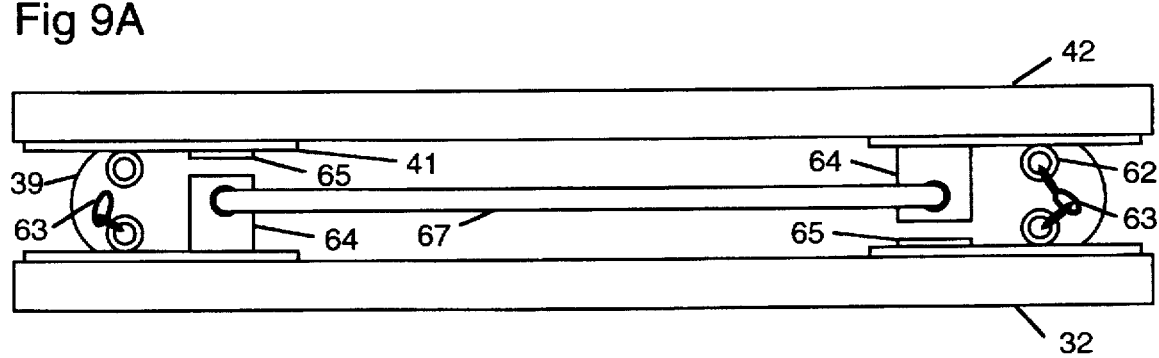
Figure 9B:
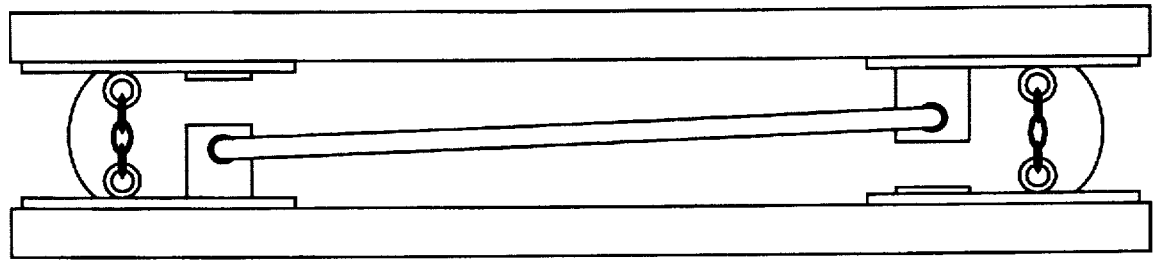

FIG. 9 returns to the centralizing and limiting components shown at 41 in FIG. 7A. One such set is fitted at each corner of the baseplate and the midplate. Each set includes an eye bolt such as 62 in FIGS. 7A and 9A; the corresponding eye bolts on the baseplate and midplate are joined by a chain 63. This chain is of such length as to be slack when the hold-down weight is applied and the vibrator is ready to vibrate; thus it does not interfere in any way with the vibration. When the hold-down weight is removed, however, the air-spring forces the baseplate and midplate apart to a limit imposed by the taut chains (FIG. 9B). This limit is such that the air-spring is still in significant compression. The baseplate displacement resulting from a vibratory force limited by the hold-down weight contemplated in this apparatus is very small; therefore the travel permitted by the chains may be quite small also.

Each corner-piece 41 also carries one post 64 and one resilient buffer 65. Thus at each corner a post 64 mounted on the baseplate interacts with a buffer 65 on the midplate and a post 64 mounted on the midplate interacts with a buffer 65 on the baseplate, to provide a double limit on the minimum separation of baseplate and midplate. This limit is required to provide stability as the operator steps on to the machine; once mounted, the operator adjusts his/her position to provide clearance between all posts and buffers.

Each post 64 is drilled at 66 (FIG. 7A) to take a rod 67 whose ends are formed at right angles and threaded to take wingnut 68. The hole 66 may be provided with a resilient bush. As shown in FIG. 9 (simplified for clarity), each rod 67 has one end secured in a post 64 attached to the baseplate 32, and the other end secured in a post 64 attached to the midplate 42. The four rods, one on each side, thereby provide lateral constraint of the baseplate relative to the midplate, while not significantly affecting the vibration between them. Adjusters (not shown) may be provided on these rods to facilitate the alignment of baseplate and midplate and thus to ensure clearance of the vibrator 31 in the hole 44. Within that clearance, the same adjustment may be used to tension the drive belt 30; alternatively, the belt tension may be maintained by a separate tensioning pulley (not shown). The inflation of the air-spring 39 is adjusted (through the valve extension 69 in FIG. 7B) to bring the rods 67 parallel to the baseplate and the midplate when the operator is mounted; it may require a supplementary adjustment if the operator changes to a heavier individual. (If the new operator is lighter, supplementary mass may be added on the top cover 55.)

The apparatus may be simply disassembled by removing the wingnuts 68 at the midplate posts 64 (thus freeing one end of the rods 67), by releasing the chains 63, by running the drive belt 30 off the pulleys 25 and 29, and by lifting the midplate off the baseplate.

The simplicity of the mechanical apparatus is maintained in the processing and display of the results. Whereas the classical method of measuring the ground response consists (at the very least) in actual measurements of the applied force and the resultant baseplate motion (both as functions of frequency), the present invention may be practised using only a measurement of the vibrator deceleration. Specifically, if s is the deceleration rate (in Hz/s) at frequency f, the quantity to be computed as a measure of the earth response may be as simple as $f^2/s$.

The input to this computation (frequency against time) can be obtained by several means. Thus FIG. 2 refers to a code generator 12 on the vibrator shaft; for example, this could be a digital transducer yielding the entire vibration waveform suitable for digital recording. More directly, the motor itself could provide an analogue counterpart during the deceleration. Alternatively, the transducer 38 in FIG. 7A, described above as a frequency transducer or a tacho, may yield merely a voltage representative of frequency (without any need to treat the whole vibration waveform). Alternatively again, the transducer may simply generate a voltage blip at every zero-crossing of the waveform (for example, using light transmitted through a small hole in the shaft 13, or a magnet and pick-up coil (not shown)); this allows ready calculation of the half-period T of the shaft, so that the exemplary quantity $f^2/s$ as a function of f, in the vicinity of sample n, becomes the quantity $2(T_n T_{n+1})/\{(T_{n+1})^2-(T_n)^2\}$ as a function of $2/(T_{n+1}+T_n)$.

The processing of the transducer data, using these computations, may be done within the vibrator unit itself, and the results displayed for the operator and recorded for subsequent analysis; alternatively the raw deceleration data may be transmitted to a stationary survey vehicle by conventional wire or radio link (not shown), and processed, recorded and displayed there.

In practice the area to be surveyed is preferably marked out in a regular grid (which may be of convenient rectangular or hexagonal form). In the simple illustration of a square grid, applied to the search for archeological artifacts, the dimension of the grid is typically 0.5 m; this accords well with a vibrator baseplate of side 0.4–0.5 m. FIG. 10 depicts such a grid at 70, and the sequence of vibrator positions 71A,B,C... occupied within the grid. At each such position the operator lowers the vibrator to the ground, stands on it, and triggers the deceleration; then the operator annuls the vibration, initiates the acceleration, raises the vibrator, and moves to the next position ready to repeat the cycle. Thus at each grid position a measurement is obtained of the natural deceleration of the vibrator on that sample of ground surface.

A display appropriate to these measurements is illustrated in FIG. 11, for the same square grid 70; then the square 72 on the display represents the measurement made in a typical cell of this grid. This display within each cell may be considered as having two superposed parts. One, shown at 73, is a simple color representation of the frequency scale, from red R (perhaps 10 Hz) through orange O, yellow Y, green G, and blue B to violet V (perhaps 100 Hz). This is fixed and constant for all cells. Over this, the second part is a graphical representation of the quantity $f^2/s$ (or a related quantity) in black-and-clear variable-area form, as shown at 74.

This display permits a very rapid and intuitive interpretation of the results as the field data are obtained. Thus the general brightness of the display is a measure of the softness of the ground; local bright areas indicate local softness (for example, buried post holes) and local dark areas indicate local hardness (for example, buried boulders or monoliths). Particular resonances or antiresonances show as local increases or decreases in particular colors; like the simple brightness, these may have an areal form that suggests a cause. And local domination by hot colors or cool colors gives some indication of the depth to local anomalies.

The above description is intended to be illustrative of one suitable form of display, but not restrictive. Many variations are possible within the scope of the invention. For example, the colors themselves may be modulated in intensity by the said or similar measure, and alternate cells may be rotated through 90° to reduce the appearance of colored strips. Other variations will be apparent to those skilled in the art.

I claim:

1. A ground survey system comprising in combination a vibrator adapted to vibrate the surface of the ground at a first location, energy-storage means capable of storing and releasing a defined quantity of energy, coupling means to release said energy into said vibrator to engender vibration at a chosen start frequency, transducing means for measuring the natural deceleration of the vibrator as the finite energy is dissipated and the frequency falls to a chosen end frequency, transporting means to allow the apparatus to be moved to second and further locations for comparative measurements, and display means for making a comparative display of the deceleration measurements on a map.

2. The ground survey system of claim 1, in which both the said vibrator and the energy-storage means are of rotary mechanical type.

3. The ground survey system of claim 1, in which the transducing means for measuring the natural deceleration of the vibrator is a tachometer whose output is recorded as a function of elapsed time following initiation of the vibrations.

4. The ground survey system of claim 1, in which the comparative display is of a variable derived from the deceleration of the vibrator as a function of time or frequency.

5. The ground survey system of claim 1, in which the comparative display is of the quotient of the square of the frequency and the deceleration rate.

* * * * *